United States Patent
Ogale

(10) Patent No.: US 7,981,177 B2
(45) Date of Patent: Jul. 19, 2011

(54) FILTRATION MEDIA HAVING A SLIT-FILM LAYER

(75) Inventor: Kumar Ogale, Thorofare, NJ (US)

(73) Assignee: Transweb, LLC, Vineland, NJ (US)

( * ) Notice: Subject to any disclaimer, the term of this patent is extended or adjusted under 35 U.S.C. 154(b) by 725 days.

(21) Appl. No.: 11/828,422

(22) Filed: Jul. 26, 2007

(65) Prior Publication Data

US 2008/0257149 A1    Oct. 23, 2008

Related U.S. Application Data

(60) Provisional application No. 60/912,545, filed on Apr. 18, 2007.

(51) Int. Cl.
    *B01D 46/00* (2006.01)
(52) U.S. Cl. ............... 55/382; 55/486; 55/522; 55/527; 55/528; 55/487; 55/DIG. 2; 55/DIG. 3; 55/DIG. 39; 95/15; 95/66; 95/68; 95/69; 96/70
(58) Field of Classification Search ............. 55/382, 55/DIG. 3, 486, 522, 527–528, 487, DIG. 2, 55/DIG. 39; 96/15, 66, 68, 69; 95/70
    See application file for complete search history.

(56) References Cited

U.S. PATENT DOCUMENTS

| | | | | |
|---|---|---|---|---|
| 3,438,180 A | * | 4/1969 | Klouda | 96/58 |
| 3,624,161 A | * | 11/1971 | Bub | 55/521 |
| 3,998,916 A | | 12/1976 | van Turnhout | |
| 4,178,157 A | | 12/1979 | van Turnhout et al. | |
| 4,589,894 A | | 5/1986 | Gin et al. | |
| RE32,171 E | | 6/1986 | van Turnhout | |
| 5,306,534 A | * | 4/1994 | Bosses | 428/35.2 |
| 5,401,446 A | | 3/1995 | Tsai et al. | |
| 5,419,953 A | * | 5/1995 | Chapman | 442/35 |
| 5,470,485 A | * | 11/1995 | Morweiser et al. | 95/273 |
| 5,492,551 A | * | 2/1996 | Wolfe | 55/496 |
| 5,603,747 A | * | 2/1997 | Matuda et al. | 55/497 |
| 6,171,369 B1 | | 1/2001 | Schultink et al. | |
| 6,183,536 B1 | * | 2/2001 | Schultink et al. | 95/57 |
| 6,372,004 B1 | * | 4/2002 | Schultink et al. | 55/382 |
| 6,395,046 B1 | | 5/2002 | Emig et al. | |
| 2001/0037982 A1 | | 11/2001 | Pulek et al. | |

(Continued)

FOREIGN PATENT DOCUMENTS

DE    20 2005 019 004 U1    5/2007

(Continued)

OTHER PUBLICATIONS

International Search Report and The Written Opinion of The International Searching Authority for corresponding PCT Application No. PCT/US2008/060616; dated Mar. 5, 2009.

*Primary Examiner* — Jason M Greene
*Assistant Examiner* — Dung Bui
(74) *Attorney, Agent, or Firm* — Fox Rothschild LLP

(57) ABSTRACT

A composite filter media for a vacuum cleaner comprising a first filtration layer comprising a slit film having a plurality of continuous electrostatically-charged polyolefin filaments disposed substantially parallel to each other along their lengths; and a second filtration layer comprising a high-efficiency filtration media selected from wet-laid filter paper, dry-laid filter paper, and nonwoven filter media; wherein said first filtration layer is disposed in series with said second filtration layer, with respect to an air flow direction through said vacuum cleaner, to form a composite.

23 Claims, 1 Drawing Sheet

U.S. PATENT DOCUMENTS

| | | | |
|---|---|---|---|
| 2002/0146636 A1* | 10/2002 | Ellis | 430/200 |
| 2004/0083695 A1* | 5/2004 | Schultink et al. | 55/382 |
| 2006/0060085 A1* | 3/2006 | Ptak et al. | 96/69 |
| 2009/0031683 A1* | 2/2009 | Schultink et al. | 55/382 |
| 2009/0064862 A1* | 3/2009 | Ptak et al. | 96/55 |
| 2009/0211211 A1* | 8/2009 | Schultink et al. | 55/382 |
| 2009/0255404 A1* | 10/2009 | Ptak et al. | 96/11 |

FOREIGN PATENT DOCUMENTS

WO  WO 95/11073  4/1995

* cited by examiner

FILTRATION MEDIA HAVING A SLIT-FILM LAYER

CROSS REFERENCE TO RELATED APPLICATIONS

This application is related to, and claims the priority benefit of, U.S. Provisional Application No. 60/912,545, filed Apr. 18, 2007, which is incorporated herein by reference.

BACKGROUND

1. Field of Invention

This invention relates to a composite filtration media for removing particulate matter entrained in a gas. More specifically, the invention relates to a composite filtration media useful in a vacuum cleaner.

2. Description of Related Art

Traditional vacuum cleaner bags possess a two-ply structure consisting of a wet-laid tissue fleece on the inside of the bag (up-stream of air flow) and filter paper on the outside of the bag (down-stream of air flow). The tissue fleece serves as a pre-filter removing only the largest dust particles. The filter paper typically has a porous structure that retains particles greater than about 10-20 μm.

It is known that the air flow and dust collection efficiency of these vacuum bags can be improved by replacing filter paper with fibrous fleeces such as meltblown (MB) ultra-fine webs, also referred to as "filtration grade MB fleece." MB fleece can simultaneously serve as a pre-filter, coarse filter, and fine filter. Often, MB fleeces are used in conjunction with a mechanical support layer either upstream or downstream of the MB fleece. For example, an MB fleece can be paired with a spunbond (SB) layer that not only provides mechanical support for the MB fleece, but also abrasion resistance for the outside surface of the bag.

Typical MB fleeces can remove particles smaller than 5 μm. Although MB fleeces have a much lower porosity than traditional vacuum cleaner filter paper, they cannot hold dust as effectively unless they are treated. To enhance filtration efficiency, the MB fleece is often electrostatically charged.

Since MB fleece serves to filter both small and large particles, it has a propensity to clog up more quickly than traditional filter paper. Clogging of the filter media restricts air flow through the vacuum bag which leads to decreased suction performance of the vacuum cleaner. To mitigate this clogging effect, a coarse filter layer can be incorporated upstream of the MB fleece. The coarse filter layer, in effect, functions as a pre-filter for very large particles of dust which constitute a bulk of the dust typically encountered by vacuum cleaners. Since the coarse filter layer holds a significant proportion of the dust, the MB fleece layer can serve more effectively as a filter of fine particles with minimal clogging.

Such a coarse filter layer, which is also known as "high dust holding capacity" or "high capacity" paper, is typically disposed on the most upstream layer inside the bag, although certain vacuum bags also utilize lightweight tissue fleece, netting or other scrim on the most inside layer upstream of the coarse filter paper. Known materials for such coarse filter layers include wet-laid high capacity paper, dry-laid high capacity paper, high bulk meltblown nonwoven, modular spunblown nonwovens, and split film fibers.

Although several materials are known for use as coarse filter layers in vacuum cleaner bags, there remains a need in the art for filter materials with performance that is as good as, or better than, known materials for coarse filters, but are more economical, simpler to produce, and easier to incorporate into a filter bag. The present invention satisfies these needs among others.

SUMMARY OF INVENTION

The present invention is directed to a composite filter media having a first filtration layer comprising at least one electrostatically charged polyolefin slit-film layer and a second filtration layer comprising high efficiency filtration media. When disposed upstream of the high efficiency filtration layer (relative to air flow through the composite), the electrostatically charged polyolefin slit-film layer can serve as a high-capacity pre-filter to trap large dust particles thereby reducing the congestive effect that these particles pose to the high efficiency filtration layer.

Accordingly, provided is a composite filter media for a vacuum cleaner comprising a first filtration layer comprising an electrostatically-charged polyolefin slit-film; and a second filtration layer comprising a high-efficiency filtration media selected from wet-laid filter paper, dry-laid filter paper, and nonwoven filter media; wherein said first filtration layer is disposed in series with said second filtration layer, with respect to an air flow direction through said vacuum cleaner, to form a composite. In certain preferred embodiments, the slit-film is a plurality of continuous electrostatically-charged polyolefin filaments disposed substantially parallel to each other, wherein at least a portion of said filaments are interconnected at two or more points along their length and wherein at least the filaments are intermittently bonded to the high efficiency media to form a laminate.

Also provided is a disposable vacuum cleaner filter comprising an outer layer comprising a high-efficiency filtration media selected from wet-laid filter paper, dry-laid filter paper, and nonwoven filter media; and an inner layer comprising a slit film having a plurality of continuous electrostatically-charged polyolefin filaments disposed substantially parallel to each other, wherein at least a portion of said filaments are interconnected at two or more points along their length and wherein said outer layer is disposed peripherally to said inner layer and at least a portion of said outer later is bonded to said inner layer to form a composite filter material.

Also provided is a method for removing particulate matter entrained in a gas comprising: (a) traversing gas entrained with particulate matter through a filter comprising: (i) a first layer comprising a slit film having a plurality of continuous electrostatically-charged polyolefin filaments disposed substantially parallel to each other along their lengths, wherein at least a portion of said filaments are interconnected at two or more points along their lengths; and (ii) a second filtration layer comprising a high-efficiency filtration material selected from wet-laid filter paper, dry-laid filter paper, and nonwoven filter media; wherein said first filtration layer is disposed upstream of said second filtration layer with respect to the direction of said traversal; and (b) removing at least a portion of said particulate matter from said gas.

Also provided is a composite filter media for a vacuum cleaner prepared by a process comprising the steps of: (a) providing a polyolefin film; (b) slitting said film to form a single layer of filaments that are substantially parallel along their lengths, wherein at least a portion of said filaments are interconnected at two or more points along their lengths; and (c) bonding at least a portion of said filaments to a high-efficiency filtration material to form a composite, wherein said high-efficiency filtration material is selected from wet-laid filter paper, dry-laid filter paper, and nonwoven filter media.

BRIEF DESCRIPTION OF THE DRAWINGS

The features and advantages of the present invention will be better appreciated and understood in view of the following description and accompanying drawings wherein.

DETAILED DESCRIPTION OF PREFERRED EMBODIMENTS

In preferred embodiments, composite filter media of the present invention comprise a first filtration layer of electrostatically charged polyolefin slit-film disposed upstream of a second layer of high efficiency particulate filter media. The convention has been adopted in this application to refer to the layers of the composite in relation to the direction of air flow. That is, the filter inlet side is "upstream" and the filter discharge side is "downstream". Occasionally herein the terms "in front of" and "behind" have been used to denote relative positions of structure layers as being upstream and downstream respectively. Traversing gas through the composite media is typically accomplished via a negative pressure gradient, sometimes referred to as "pressure drop", across the composite media. Normally, the upstream side of a vacuum bag filter faces the inside of the bag while the downstream side faces the outside of the bag.

The composite filter media of this invention can be used to remove particulate matter from a gas, such as air. Particular applications contemplated include vacuum filters, including vacuum cleaner bags. By "vacuum filter" is meant a filter structure intended to operate by traversing a gas, such as air, which entrains usually dry solid particles, through the filter structure.

A. Slit-Films

Figure 1:
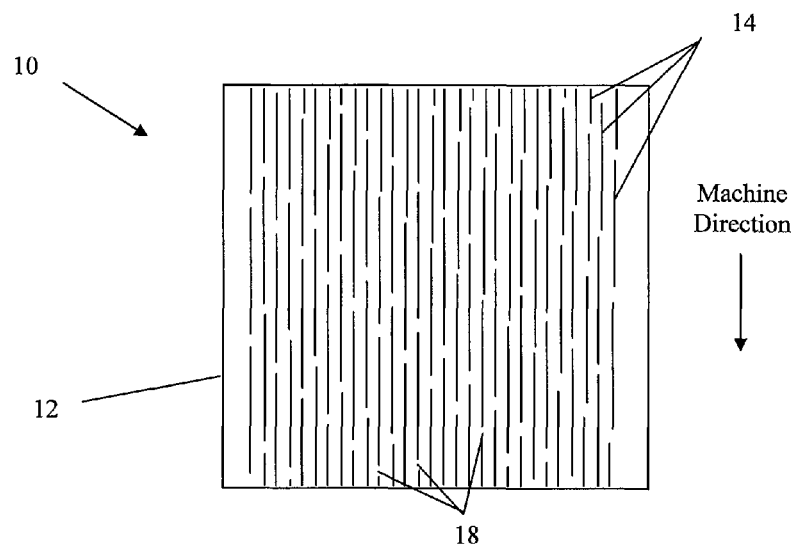
FIG. 1 shows one embodiment of a slit-film according to the present invention.

As shown in FIG. 1, a slit-film 10 for use in the present invention preferably is a electrostatically-charged plastic film 12 in which multiple long, straight, narrow openings, such as cuts, gashes, incisions, slashes, slices, and the like, have been formed thereby creating continuous filaments traversing the film. Preferably these openings 14 extend in the machine direction of the film and are orientated approximately parallel to one another. In certain embodiments, such as the one shown in FIG. 1, these parallel filaments are interconnected 18 to the adjacent filament at various points along their lengths. The openings between the filaments are sized and distributed to permit air flow through the film while the film captures particulate matter from the passing air.

The filaments of the present invention preferably have the approximate shape of a trapezoid having at least one pair of parallel sides. Preferred trapezoid shapes include parallelograms, with oblong rectangles being particularly preferred. It has been found that compared to apertured films or to entangled filaments, the filaments of the present invention have a superior combination of properties desirable in vacuum cleaner filters, including low production costs and complicacy, high air permeability, and high entrainment of particulate matter. Also, these filaments have a superior scrubbing and dust lift off when used as an electrostatic dust wipe.

Preferably, filaments of the present invention have a length ranging from about 0.5 to about 15 mm, more preferably from about 0.5 to about 3 mm; a width ranging from about 0.2 to about 5 mm, more preferably from about 1 to about 2 mm; and a thickness ranging from about 2 $\mu$m to about 1000 $\mu$m, and more preferably from about 5 $\mu$m to about 100 $\mu$m. More preferably there is no gap between the filaments when the film is free of a load, that is, the filaments abut each other when at rest. It is understood, however, that the dimensions of the filaments and slits are not necessarily limited to these ranges, but instead can be of any length, width, or thickness practical for use in filter media.

The slit-films of the present invention, and their respective filaments, are preferably made of a polyolefin, such as polypropylene (PP). However, any polymer suitable for making films that can hold an electrostatic charge may be used. Examples of suitable polymers include, but are not limited to, polyolefins, such as homopolymers and copolymers of polyethylene; polyterephthalates, such as poly(ethylene terephthalate) (PET), poly(butylene terephthalate) (PBT), poly(cyclohexyl-dimethylene terephthalate) (PCT); polycarbonate; and polychlorotrifluoroethylene (PCTFE). Other suitable polymers include nylons, polyamides, polystyrenes, poly-4-methylpentene-1, polymethylmethacrylates, polyurethanes, silicones, polyphenylene sulfides. The slit-film may also comprise a mixture of homopolymers or copolymers.

In the present application, the invention is exemplified with slit-film made of polypropylene. The use of PP polymers with various molecular weights and morphologies in laminate film structures has been shown to produce films with mechanical properties advantageous for electrostatically charged slit-films.

In certain preferred embodiments, the slit-film comprising the filaments has a basis weight of about 5 to about 100 g/m$^2$, more preferably about 5 to about 50 g/m$^2$. Preferably, the slit-film has an air permeability of about 500 to about 10,000 L/(m$^2$·s) at 200 Pa, more preferably from about 3000 to about 8000 L/(m$^2$·s) at 200 Pa.

Methods for producing slit-films having continuous filaments according to the present invention generally involve stretching the film, slitting the film, and subjecting the film to corona treatment. A preferred method for stretching films is disclosed in U.S. Pat. No. 3,998,916 (van Turnhout) and corresponding RE 32,171, which are incorporated herein by reference. This method involves stretching a high-molecular weight film in two stages. First, the film is drawn over a heated block and through the nip of a pair of rollers. This process increases the length:width ratio of the film by about 1 to about 4 but does not significantly reduce the overall width of the film. Instead, the length of the film is increased by reducing the thickness of the film. Second, the film is drawn over a heated curved plate to further increase the length:width ratio by about 1 to about 1.5.

Another preferred method for stretching films is disclosed in U.S. Pat. No. 4,178,157, which is incorporated herein by reference. According to this method, polypropylene is melted and extruded into a film which is then blown into a large tube (balloon) into which ambient air is introduced or allowed to enter in accordance with conventional blow stretching technology. Inflating the balloon with air serves to cool the film and to bi-axially orient the molecular structure of the PP molecular chains, resulting in greater strength. The balloon is then collapsed and the film is stretched between two or more nips by rotating the nip roller pairs at different speeds. This stretching result is an even greater molecular orientation to the film in the machine direction.

Subsequent to, or concurrently with, the stretching operation, the film is slitted with a cutting device. One method of slitting the film involves guiding the film across a needle roller, preferably a needle roller having metal pins, or a blade roller. By rotating the needle roller at a peripheral velocity different than the linear velocity of the film, or in a rotational direction opposed to the travel direction of the film, slits corresponding to the machine direction are produced in the film. Other methods of slitting the film involve the use of matching pin rollers, heated pin rollers, air knives, and the like, or some combination thereof.

The slits produced in the film preferably penetrate the entire thickness of the film; i.e., extend from one face of the film to the other. In certain preferred embodiments, the slits intermittently disposed along the length of the film so that a single slit does not traverse the entire length of the film. By slitting the film intermittently, two or more continuous filaments traversing the length of the film are interconnected at two or more points along their length. This interconnection among the filaments provides, in part, structural support for the first filter layer.

The size, number, and orientation of the slits are not particularly limited provided that air can effectively pass through the film when one face of the film is subjected to a vacuum and that the film, as a whole, retains sufficient structural integrity for use as filter media. Rows of parallel slits may be aligned or offset The film may be electrostatically charged before or after it has been slitted. Various electrostatic charging techniques may be employed to charge the film. One method, for example, involves a charging device having multiple thin tungsten wires laid across the grounded curved heated plate and connected with the negative terminal of a voltage source. The device sprays a negative charge on to the top of a film by means of the corona effect as the film is drawn past the device. Preferably, the wires are placed towards the beginning of the plate. Although this arrangement leads to partial discharging of the film as it travels further across the heating plate, the charges lost are primarily those that are the least stable. Thus, this arrangement thermally ages the film so that most of the remaining charges are embedded in a very stable way. As a result the remaining charge of the film has an exceptionally high persistence at ambient temperature. In fact, the thermal stability of the charge that is left is also increased. Moreover, the stability of the electrostatic charge against moisture is considerably improved.

Another method for charging a film involves passing the film about midway in a gap of about 1.5 to 3 inches between two DC corona electrodes. Corona bars with emitter pins of metallic wire may be used in which one corona electrode has a positive DC voltage potential of about 20 to 30 kV and the opposing electrode has a negative DC voltage of about 20 to 30 kV.

Other preferred methods of charging a film include the two electrostatic charging techniques described in U.S. Pat. No. 5,401,446 (Tsai). The first technique involves suspending the film on insulated rollers as the film passes around the inside circumference of two negatively charged metal shells with a positive corona wire for each shell. Generally, about 1000 to about 3000 positive volts are imparted on one side of the film with a similar magnitude of negative volts imparted on the other side of the film.

The second technique involves contacting the film with a metal roller having a DC voltage of about −1 kV to about −10 kV and a wire having a DC voltage of about +20 kV to about +40 kV disposed about 1 to about 2 inches above the negatively biased roller. Each side of the film is exposed in succession to this roller/wire charging configuration. About 300 to about 1500 volts are imparted on each side of the film, each side having an opposite polarity. The higher surface potentials obtained by this technique, however, have not been found to result in better measurable filtration efficiencies of the webs made from the slit-film. Therefore, and because it is easier and more economic to treat the film via the first technique, this method is preferred.

B. High Efficiency Filtration Media

Figure 2:
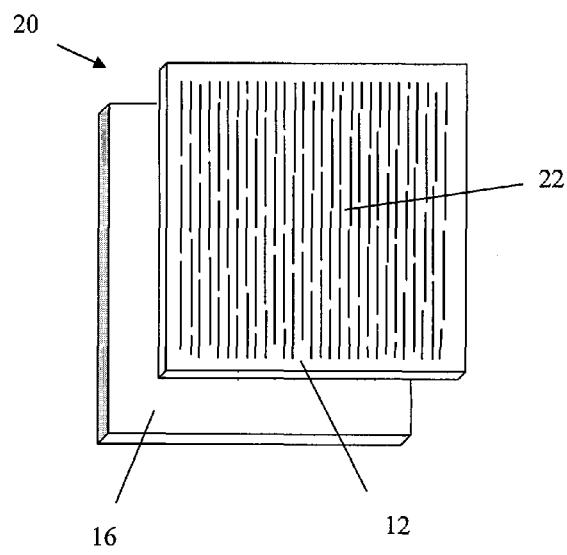
FIG. 2 is an expanded view of a composite filter media with the upstream side in front.
Figure 3:
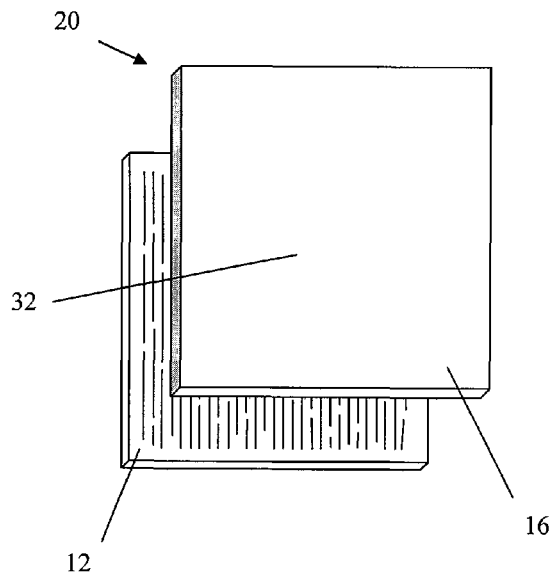
FIG. 3 is an expanded view of a composite filter media with the downstream side in front.

As shown in FIGS. 2 and 3, the composite filtration media 20 of the present invention includes a layer of high efficiency filtration media 16 that is intended to remove a significant amount of fine particulate matter from the air passing through the composite. In certain preferred embodiments, the high efficiency filtration media layer, relative to the slit-film layer, is less porous and thus removes more of the smaller particles compared to the slit-film layer. In contrast, the slit-film layer removes a bulk of the filtration load thereby leaving only the small amount of fine dust size particles to be removed by the high efficiency filter layer.

In certain embodiments, the slit-film layer 12 is disposed on the upstream side 22 of the composite 20 and, correspondingly, the high efficiency filtration layer is disposed on the downstream side 32 of the composite 20. Thus, the slit-film layer and the high efficiency filtration media layer complement each other during the filtration process to provide long-lasting and efficient filtration. However, in certain other embodiments, the slit-film layer is downstream of the high efficiency filtration media.

In certain highly preferred embodiments, the slit-film is intermittently bonded to the high efficiency filtration media to form a composite material. The extent of bonding (i.e., the bonded surface area of the slit-film and of the high efficiency filtration media) and the bonding pattern is such that, preferably, it involves no more than a de minimis effect on the composite's air permeability and efficiency, but is great enough to maintain the integrity of the composite when the composite is subjected to typical uses such filtration media for residential or commercial vacuum cleaning.

Any practical bonding techniques can be used to bond the two layers together including, but not limited to, thermal bonding, mechanical bonding, thermo-mechanical bonding, chemical bonding, and ultrasonic bonding.

In preferred embodiments, the high efficiency filtration media is selected from either a wet-laid or a dry-laid filter paper having a base weight of about 30-100 g/m$^2$ and air permeability of about 100-3000 L/(m$^2$·s) or, more preferably, a thermally bonded or spunbond nonwoven having a basis weight of about 10-100 g/m$^2$ and a permeability of about 100-3000 L/(m$^2$·s).

In certain embodiments, the high efficiency filtration media is a filtration grade thermally bonded nonwoven fleece. Methods of producing such fleeces are well known. For example, U.S. Pat. No. 4,589,894 (Gin), which is incorporated herein by reference, describes fleeces constructed of micro-fibers which have been meltblown (prepared by extruding molten fiber-forming material), solution-blown (prepared by extruding a solvent solution of fiber-forming material), or other means. The micro-fibers can be formed of any of a variety of fiber-forming thermoplastic materials including, for example, polypropylene, polyethylene terephthalate, polyethylene, polyamides, and other polymers known in the art. The preferred thermoplastic material for forming the micro-fibers is polypropylene. Polypropylene is preferred because it has lower melt temperatures and is less expensive than nylon or polyethylene terephthalate. Useful methods of preparing such micro-fibers are described in Wente, Van A. "Superfine Thermoplastic Fibers", Industrial Engineering Chemistry, Vol. 48, page 1342 et seq (1956), and Report No. 4364 of the Navel Research Laboratories, published May 25, 1954, entitled "Manufacture of Superfine Organic Fibers" by Wente, V. A., Boone, C. D., and Fluharty, E. L.

Meltblown nonwovens are typically prepared by blowing extruded thermoplastic filaments onto a screen. The basis weight of the nonwoven is controlled by the polymer output and the speed of the deposit screen. The air permeability results from the packing density of the fibers, which in turn is controlled by the fiber diameter and by the impact energy of the fibers on the deposit screen. The thickness of the meltblown non-woven tissues is adjusted by the fiber diameter, by the ratio of polymer speed on exit from the capillaries and the air speed of the blown air and by the resultant degree of extension of the filaments. The packing density and the air permeability of the non-woven tissues are also influenced by the temperatures of the polymer melt and of the blown air. The impact energy of the fibers on the deposit screen can be controlled by the blown air speed and the spacing between the meltblown nozzle and the deposit screen. To influence the breaking resistance, the fibers can be partially welded, e.g. in the form of a dot or lattice pattern. Furthermore, it is possible to introduce bonding agents by impregnation or by spraying to increase the strength.

In certain other embodiments, the high efficiency filtration media is a nonwoven tissue of spunbond nanofibers. Methods of producing such nonwoven tissues are described in, for example, U.S. Pat. No. 6,395,046 (Emig) which is incorporated herein by reference. Preferably, the nanofibers have a diameter of about 10 nm to 1000 nm, more preferably from 50 to 500 nm. Such fibers are preferably produced from a thermoplastic polymer such as polyethylene, polypropylene, polybutene, polymethyl pentene, polychloro-trifluoroethylene, polyamide, polyester, polycarbonate, polysulfon, polyether sulfon, polyphenylene sulfide, polyacryl nitrile, polyvinyl chloride, polystyrene, polyaryl ether keton, polyvinylene flouride, polyoxy methylene, polyurethane, or copolymers or mixtures thereof.

One method of producing spunbond nanofibers, involves spinning a thermoplastic polymer, while it is in a molten state or as a polymer dissolved in a suitable solvent, from nozzles in a strong electrical field to form fine fibers, which are then guided past a counter electrode and deposited in the form of a planar structure. This process is commonly known as electro-spinning. The diameter of the fibers can be controlled by the viscosity of the melt (in the case of thermoplastics) and/or the concentration and viscosity of the polymer solution. The basis weights of the nano-nonwoven tissue are determined by a combination of mass flow through the nozzles and speed at which the substrate is moved under the nozzles. The air permeability of the nano non-woven tissue is influenced by the thickness of the fibers and by their packing density.

For embodiments that utilize a filter paper, a wet-laid paper is preferred. Such filter papers comprise long and/or short cellular fibers, mixtures of long and/or short cellular fibers and synthetic fibers, mixtures of long and/or short cellular fibers and glass fibers, or mixtures of long and/or short cellular fibers, synthetic fibers, and glass fibers. Production of such filter paper is well known. Conventional production techniques typically involve dispersing the fibers in water and subsequently separating the fibers from the water by means of a screen to form a planar structure (i.e., a sheet). The wet paper sheet is then dried. The basis weight of the filter paper can be adjusted by the dosed amount of the fibers and by the paper machine speed. The air permeability of the filter paper is determined by the packing density, the different fiber diameter of the cellulose which is used, synthetic fibers and/or glass fibers as well as by the mix ratio of the various fiber types. The basis weight also has an influence on the air permeability, i.e., increasing basis weight reduces the air permeability. The breaking resistance of the filter paper can be controlled by fibrillation, grinding of the cellulose, and by the introduction of bonding agents. In this context, the bonding agents can be impregnated or sprayed on the paper sheet. Then the solvent or dilution agent of the binder, which in most cases is water, is evaporated and the paper sheet is again dried. The bonding agents can also be inserted in the paper mass, i.e. the solidification agents are added to the dispersed fibers and are fixed on the fiber surface, before the sheet formation is carried out on the screen of the paper machine and then the sheet is dried in the usual way. A further possibility is to spray the bonding agent in dissolved or dispersed form on the wet paper sheet before the sheet is dried.

C. Optional Layers

In certain embodiments, the composite filter media includes an outermost layer downstream and/or upstream of the other layers. This outermost layer provides support for the high efficiency and/or slit-film layer and also provides abrasion resistance. Preferably, the outermost layer is (a) a spunbond, wet-laid, dry-laid or hydroentangled nonwoven scrim or netting having a basis weight of about 6-80 $g/m^2$ and air permeability of about 500-10,000 $L/(m^2 \cdot s)$, (b) an odor absorbing composite comprising an activated carbon fiber layer having a basis weight of about 25-500 $g/m^2$ and air permeability of about 500-3000 $L/(m^2 \cdot s)$, and (c) a supporting fleece having a basis weight of about 15-100 $g/m^2$ and air permeability of about 2000-5000 $L/(m^2 \cdot s)$. Any of these materials can also be incorporated into the composite as a layer that is not the outermost layer.

In certain embodiments, the composite filter media includes one or more supplemental filtration layers in addition to the slit-film layer and the high efficiency filtration layer. Preferably, the supplemental filtration layer or layers are selected from (a) a wet-laid high capacity paper, (b) a dry-laid high capacity paper, (c) a high bulk meltblown nonwoven, (d) a modular spunblown nonwoven, (e) split-film fiber mats, or (f) some combination thereof.

Wet-laid high capacity paper usually comprises a mixture of wood pulp fibers and synthetic fibers, preferably comprising up to about a majority of wood pulp and a lesser amount of synthetic fiber, such as PET. Pore size is up to 160 mm, thus allowing the paper to hold much more dust in its pores before clogging up. The wet-laid capacity paper preferably has a fine dust particle filtration efficiency of about 66-67% as determined by the DIN 44956-2 and an air permeability preferably of about 500-8000 $L/(m^2 \cdot s)$, preferably about 1000-5000 $L/(m^2 \cdot s)$ and most preferably about 2000-4000 $L/(m^2 \cdot s)$. The upper limit of permeability is defined to assure that the paper filters holds a major fraction of the dust particles larger than about 10 mm.

Dry-laid high capacity paper is not formed from a water slurry, but is produced with air-laying technology that preferably includes a fluff pulp process. Such processes are known in the art. The filtration efficiency as determined by the DIN 44956-2 Test is approximately 80%. Dry-laid capacity paper preferably has a permeability in the range of about 500-8000 $L/(m^2 \cdot s)$, preferably about 1000-5000 $L/(m^2 \cdot s)$, and most preferably about 2000-4000 $L/(m^2 \cdot s)$. It has excellent dust holding capacity and has the advantage of being much more uniform in weight and thickness than the wet-laid papers. In a preferred embodiment, the dry-laid capacity paper comprises a thermally bonded blend of fluff pulp fibers and at least one of split film fibers and bicomponent polymer fibers. More preferably, the blend of fluff pulp fibers comprises fluff pulp fibers and bicomponent polymer fibers.

High bulk meltblown nonwovens of this invention should be distinguished from "filtration grade meltblown" nonwovens which may also be employed in the composite filter media. Filtration grade MB webbing is a conventional meltblown nonwoven generally characterized as having a low basis weight (e.g., 10-50 g/m$^2$), small pore size, and air permeability of 100-1500 L/(m$^2$·s). In contrast, high bulk MB is generally characterized as having a basis weight of 60-120 g/m$^2$, relatively larger pore size, and air permeability of 300-8000 L/(m$^2$·s). Methods of making high bulk MB nonwoven are known (see, e.g., U.S. Pat. No. 6,171,369).

Modular spunbond nonwoven can be constructed of any spunbond-capable polymer such as polyamides, polyesters or polyolefins. Basis weight of the spunbond nonwoven is preferably about 10 g/m$^2$ to about 100 g/m$^2$ and more preferably about 30 to about 40 g/m$^2$. The spunbond nonwoven should have an air permeability of about 500-10,000 L/(m$^2$·s), and preferably about 2,000-6,000 L/(m$^2$·s) as measured by DIN 53887. The spunbond nonwoven can also be electrostatically charged.

Split-film fiber mats consist essentially of entangled fibers derived from films which may be electrostatically charged before or after being incorporated into a mat for use in the composite structure of the invention. The thickness of the film fibers may range from 2-100 μm, the width may range from 5 μm to 2 millimeters, and the length may range from 0.5 to 15 mm. However, the preferred dimensions of the split film fibers are a thickness of about 5 to 20 μm, a width of about 15 to 60 μm, and a length of about 0.5 to 3 mm. The thickness and density of the mat may be varied depending on the desire use. Methods for producing nonwoven mats of entangled split-film fibers are known. (See, e.g., U.S. Pat. No. 6,171,369)

The above-mentioned supplemental filtrations layer or layers can be disposed upstream, downstream, or both upstream and downstream of the slit-film layer. Alternatively or additionally, the supplemental layer or layers can be disposed upstream, downstream, or both upstream and downstream of the high efficiency layer. Certain preferred combinations of layers are provided in Table A. It is understood that the invention is not necessarily limited to these particular combinations, but instead can include any practical combination of layers.

TABLE A

Composite Filter Media Layers

← downstream                                                                                                        upstream →

| | |
|---|---|
| A | wet-laid high efficiency filter paper/slit-film |
| B | dry-laid high efficiency filter paper/slit-film |
| C | MB fleece/slit-film |
| D | spunbond nonwoven/slit-film |
| E | supporting fleece/activated carbon/MB fleece/slit-film |
| F | supporting fleece/activated carbon/spunbond nonwoven/MB fleece/slit-film |
| G | spunbond nonwoven/MB fleece/slit-film/high bulk MB nonwoven |
| H | spunbond nonwoven/MB fleece/slit-film/modular spunblown |
| I | spunbond nonwoven/MB fleece/slit-film/split-film fiber |
| J | spunbond nonwoven/MB fleece/slit-film/wet- or dry-laid high capacity paper |
| K | spunbond nonwoven/MB fleece/slit-film/wet- or dry-laid high capacity paper/supporting fleece |
| L | spunbond nonwoven/MB fleece/slit-film/wet- or dry-laid high capacity paper/spunbond scrim or netting |
| M | spunbond nonwoven/MB fleece/spunbond nonwoven/slit-film/wet- or dry-laid high capacity paper |
| N | spunbond nonwoven/MB fleece/spunbond nonwoven/slit-film/wet- or dry-laid high capacity paper/supporting fleece |
| O | spunbond nonwoven/MB fleece/spunbond nonwoven/slit-film/wet- or dry-laid high capacity paper/spunbond scrim or netting |
| P | supporting fleece/activated carbon/MB fleece/slit-film/wet- or dry-laid high capacity paper |
| Q | supporting fleece/activated carbon/MB fleece/slit-film/wet- or dry-laid high capacity paper/supporting fleece |
| R | supporting fleece/activated carbon/MB fleece/slit-film/wet- or dry-laid high capacity paper/spunbond scrim or netting |
| S | spunbond nonwoven/MB fleece/slit-film/activated carbon/supporting fleece |
| T | spunbond nonwoven/MB fleece/slit-film/activated carbon/supporting fleece/wet- or dry-laid high capacity paper |
| U | spunbond nonwoven/MB fleece/slit-film/activated carbon/wet- or dry-laid high capacity paper/supporting fleece |
| V | spunbond nonwoven/MB fleece/spunbond nonwoven/slit-film/activated carbon/supporting fleece/wet- or dry-laid high capacity paper |
| W | MB fleece/wet- or dry-laid high capacity paper/slit-film |
| X | spunbond nonwoven/MB fleece/wet- or dry-laid high capacity paper/slit-film |
| Y | supporting fleece/activated carbon/spunbond nonwoven/MB fleece/wet- or dry-laid high capacity paper/slit-film |
| Z | spunbond nonwoven/MB fleece/slit-film/slit-film/slit-film/supporting fleece |
| AA | spunbond nonwoven/MB fleece/wet- or dry-laid high capacity paper/slit-film/high bulk MB nonwoven |
| BB | spunbond nonwoven/MB fleece/high bulk MB nonwoven/slit-film/supporting fleece/slit-film/supporting fleece |

Any of the above-mentioned layers, including high capacity filtration layers, high efficiency filtration layers, supplemental filtration layers, and outermost layers, can be bonded to any other adjacent layer. Preferred bonding methods include one or more of thermal bonding, adhesive bonding, ultrasonic bonding, and the like.

D. Disposable Vacuum Cleaner Filter

The present invention also provides a disposable vacuum cleaner filter comprising a high efficiency layer and a slit-film layer as described above. More specifically, the vacuum cleaner filter comprises (a) an outer layer comprising a high-efficiency filtration media selected from wet-laid filter paper, dry-laid filter paper, and nonwoven filter media; and (b) an inner layer comprising a slit film having a plurality of continuous electrostatically-charged polyolefin filaments disposed substantially parallel to each other, wherein at least a portion of said filaments are interconnected at two or more points along their length; wherein said outer layer is disposed peripherally to said inner layer and at least a portion of said outer later is bonded to said inner layer to form a composite filter material.

The vacuum cleaner filter of the invention may have the form of any conventional filter of the type presently used in conventional vacuum cleaners. Examples of such forms include smooth or pleated sheets which may be disc-shaped, rectangular, square, bag-shaped, cylindrical, etc. The preferred filter of the invention comprises a closed container having an inlet for connection to the air discharge outlet of a vacuum cleaner. When used in a vacuum cleaner, these vacuum cleaner filters effectively remove small particles suspended in air and retains a low pressure drop as the bag becomes filled with particulate material such as dust and dirt. The filter is relatively inexpensive and thus may be disposed of after filling.

E. Method of Removing Particles

The present invention also provides a method of removing particulate matter entrained in a gas. In particular, the method comprises (a) traversing gas entrained with particulate matter through a filter comprising: (i) a first layer comprising a slit film having a plurality of continuous electrostatically-charged polyolefin filaments disposed substantially parallel to each other along their lengths, wherein at least a portion of said filaments are interconnected at two or more points along their lengths; and (ii) a second filtration layer comprising a high-efficiency filtration material selected from wet-laid filter paper, dry-laid filter paper, and nonwoven filter media; wherein said first filtration layer is disposed upstream of said second filtration layer with respect to the direction of said traversal; and (b) removing at least a portion of said particulate matter from said gas.

EXAMPLES

The following prophetic examples will demonstrate the performance of the composite filter media of the present invention with respect to air permeability after fine dust loading and media filtration efficiency.

DIN 44956-2 (April, 1980) test is employed to characterize the performance of vacuum bag filter composites with respect to filtering fine dust particles. This test involves filtering a 500 mg sample of SAE fine test dust through a circular 200 square centimeter of filter medium being tested using an air flow of 10 liters per second within a 30 second time period. The pressure drop through the test filter medium is measured before and after filtration. An absolute filter is employed to capture particles which pass the test filter. A coefficient of retention expressed as a percentage is calculated as the quotient of the weight of sample captured by the test filter divided by the total of the test filter-captured sample weight and the weight of sample caught by the absolute filter.

To test for air permeability after fine dust loading, the dust loading part of the DIN 44956-2 is performed at 0.5 gram increments on seven bags of each sample. The maximum sustainable air permeability values are then determined on the bags, which had the specified levels of dust loading.

A TSI Model 8110 filter tester is used for the measurement of media filtration efficiency. With the Model 8110 tester, a 2.0% sodium chloride solution (20 g NaCl in 1 liter of water) is aerosolized by an aerosol generator. The NaCl water drops in aerosol are heated forming NaCl crystallites with a diameter of about 0.1 µm. The mass concentration of NaCl in the air is 101 mg/m$^3$. Photometry is used to detect the volume concentration of the air in the upstream volume of the media (Cu) and the volume concentration of the air in the downstream volume of the media (Cd). The penetration ability of the NaCl particles was calculated as: Penetration (P)=[Cd/Cu]×100%.

The above-mentioned tests are performed on a composite filter media consisting of a meltblown fleece nonwoven layer that is adjacent to, and downstream of, a slit-film layer. For comparison, these tests are also performed on a composite filter media consisting of a spunbond nonwoven layer that is adjacent to, and downstream of, a meltblown fleece layer, that in turn is adjacent to, and downstream of, a meltblown bulky layer. The results of these tests will show that composite filter media of the present invention performs comparable to, or better than, known composite filter media.

Having thus described a few particular embodiments of the invention, various alterations, modifications, and improvements will readily occur to those skilled in the art. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A composite filter media for a vacuum cleaner comprising:
   a. a first filtration layer comprising an electrostatically-charged polyolefin slit-film formed from a plurality of continuous electrostatically-charged polyolefin filaments disposed substantially parallel to each other along their lengths; and
   b. a second filtration layer comprising a high-efficiency filtration media selected from wet-laid filter paper, dry-laid filter paper, and nonwoven filter media;
   wherein said first filtration layer is disposed in series with and upstream from said second filtration layer, with respect to an air flow direction through said vacuum cleaner, to form a composite.

2. The composite filter media of claim 1 wherein said polyolefin is homopolymers, copolymers, or mixture thereof.

3. The composite filter media of claim 1 wherein said slit film has a basis weight of about 5 to about 100 g/m$^2$.

4. The composite filter media of claim 1 wherein said first filtration layer has an efficiency of about 5 to about 95%.

5. The composite filter media of claim 1 further comprising one or more additional layers selected from wet-laid high capacity paper, dry-laid high capacity paper, high bulk melt blown nonwoven, spunbond nonwoven, activated carbon, and fibrous mat.

6. The composite filter media of claim 1 wherein each of the plurality of continuous electrostatically-charged polyolefin filaments has a trapezoidal shape along its length.

7. The composite filter media of claim 1 wherein said polyolefin is selected from the group consisting of polypropylene, polyethylene, polyterephthalates, polycarbonate, polychlorotrifluoroethylene, nylons, polyamides, polystyrenes, poly-4-methylpentene-1, polymethylmethacrylates, polyurethanes, silicones, and polyphenylene sulfides.

8. The composite filter media of claim 7 wherein said polyolefin is polypropylene.

9. The composite filter media of claim 1 wherein said first filtration layer has an air permeability of from about 500 to about 10,000 L/(m$^2$·s) at 200 Pa.

10. The composite filter media of claim 9 wherein said first filtration layer has an air permeability of from about 3000 to about 8000 L/(m$^2$·s) at 200 Pa.

11. The composite filter media of claim 1 wherein said high-efficiency filtration media is selected from (a) a wet-laid or dry-laid filter paper having a basis weight of about 30 to about 100 g/m$^2$ and air permeability of about 100 to about 3000 L/(m$^2$·s) at 200 Pa, and (b) a nonwoven filter media having a basis weight of about 30 to about 100 g/m$^2$ and air permeability of about 100 to about 3000 L/(m$^2$·s) at 200 Pa.

12. The composite filter media of claim 11 wherein said high-efficiency filtration media has an air permeability of from about 500 to about 1500 L/(m$^2$·s) at 200 Pa.

13. The composite filter media of claim 1 wherein said first filtration layer consists essentially of said polyolefin slit-film.

14. The composite filter media of claim 13 wherein said second filtration layer consists essentially of a melt blown nonwoven fleece.

15. The composite filter media of claim 1 wherein at least a portion of said filaments are interconnected at two or more points along their length.

16. The composite filter media of claim 15 wherein at least a portion of said first filtration layer is bonded to at least a portion of said second filtration layer to form a laminate.

17. The composite filter media of claim 16 wherein said filaments are substantially rectangular and have a length of about 0.5 to about 15 mm and a width of about 0.2 to about 5 mm.

18. The composite filter media of claim 17 wherein said filaments are separated by an average distance of not more than about 5 µm.

19. The composite filter media of claim 17 wherein said filaments have a thickness of about 2 to about 1000 µm.

20. The composite filter media of claim 19 wherein said filaments have a thickness of about 5 to about 100 µm.

21. A disposable vacuum cleaner filter comprising:
  a. an outer layer comprising a high-efficiency filtration media selected from wet-laid filter paper, dry-laid filter paper, and nonwoven filter media; and
  b. an inner layer comprising a slit film having a plurality of continuous electrostatically-charged polyolefin filaments disposed substantially parallel to each other,
  wherein at least a portion of said filaments are interconnected at two or more points along their length;
  wherein said outer layer is disposed peripherally to said inner layer and at least a portion of said outer later is bonded to said inner layer to form a composite filter material, and
  wherein said inner layer is disposed upstream of said outer layer with respect to an air flow direction through said vacuum cleaner filter.

22. The disposable vacuum cleaner filter of claim 21 wherein said filter is in a shape of a smooth sheet, pleated sheet, bag, or cylinder.

23. A method for removing particulate matter entrained in a gas comprising:
  a. traversing gas entrained with particulate matter through a filter comprising: (i) a first layer comprising a slit film having a plurality of continuous electrostatically-charged polyolefin filaments disposed substantially parallel to each other along their lengths, wherein at least a portion of said filaments are interconnected at two or more points along their lengths; and (ii) a second filtration layer comprising a high-efficiency filtration material selected from wet-laid filter paper, dry-laid filter paper, and nonwoven filter media; wherein said first filtration layer is disposed upstream of said second filtration layer with respect to the direction of said traversal; and
  b. removing at least a portion of said particulate matter from said gas.

* * * * *